United States Patent [19]
Fulton

[11] Patent Number: 5,863,204
[45] Date of Patent: Jan. 26, 1999

[54] APPARATUS AND METHOD FOR TEACHING CHARACTER

[76] Inventor: Gordon S. Fulton, 2200 Wilson Mills Ct., Pleasant Garden, N.C. 27313

[21] Appl. No.: 951,491

[22] Filed: Oct. 16, 1997

Related U.S. Application Data

[60] Provisional application No. 60/029,196 Oct.30, 1996.

[51] Int. Cl.[6] ........................................... G09B 1/34
[52] U.S. Cl. .................... 434/172; 434/167; 434/171
[58] Field of Search ................... 434/156, 171, 434/172, 403, 208, 178, 167

[56] References Cited

U.S. PATENT DOCUMENTS

| | | | |
|---|---|---|---|
| D. 282,264 | 1/1986 | Wiese . | |
| D. 307,453 | 4/1990 | Russell . | |
| 1,286,631 | 12/1918 | Hillyard | 434/167 |
| 2,987,833 | 6/1961 | Stolpen | 434/176 |
| 3,670,427 | 6/1972 | Stolpen . | |
| 3,728,800 | 4/1973 | Magram . | |
| 4,158,921 | 6/1979 | Stolpen | 434/403 |
| 4,508,347 | 4/1985 | Shettler . | |
| 4,846,687 | 7/1989 | White et al. | 434/161 |
| 4,878,844 | 11/1989 | Gasper et al. | 434/178 |
| 4,950,165 | 8/1990 | Machaalani . | |
| 5,275,567 | 1/1994 | Whitfield . | |
| 5,492,473 | 2/1996 | Shea | 434/156 |
| 5,509,720 | 4/1996 | Croom . | |

*Primary Examiner*—Paul J. Hirsch
*Attorney, Agent, or Firm*—Richard C. Litman

[57] ABSTRACT

Apparatus for teaching the usage, spelling, and meaning of words, the components of the apparatus including structural units having letters and words superimposed thereon. Each structural unit relates a word with the initial letter thereof. Moreover, the structural units provide an arrangement by which one may spell and use words alone and in phrases and sentences.

5 Claims, 2 Drawing Sheets

APPARATUS AND METHOD FOR TEACHING CHARACTER

CROSS REFERENCE TO RELATED APPLICATIONS

This application claims the benefit of U.S. Provisional Application Ser. No. 60/029,196 filed Oct. 30, 1996.

BACKGROUND OF THE INVENTION

1. Field of the Invention

The present invention relates to an educational apparatus and method for using the apparatus, more specifically, to an apparatus and method for teaching and building character.

2. Background

Young people may find education to be a foreign and intimidating experience. Toys, on the other hand, are a familiar and inviting medium among them. The use of toys in education therefore can help encourage young people to embrace the learning process. Children also may be hesitant to learn the spelling, meaning, and usage of particular words, such as descriptive words relating to personal behavior and character. A toy for teaching these elements therefore would help young people to learn the meaning and usage of such words.

Devices and systems for displaying indicia on structural units have been described in past publications. In some instances, the indicia-bearing devices would include a cubical structure with a plurality of faces, whereby each face has a single letter or word superimposed thereon. Furthermore, some indicia-bearing devices would provide a means for forming phrases and sentences.

The prior art discloses numerous toy block devices including alpha-numeric characters. For example, U.S. Pat. No. 3,670,427 issued on Jun. 20, 1972 to Stolpen discloses a language teaching apparatus whereby boxes have words superimposed thereon. Words are selected for a particular box based on the grammatical part and class of speech thereof. U.S. Pat. No. 3,728,800 issued on Apr. 24, 1973 to Magram discloses an educational apparatus comprising structural units which challenges one to create grammatically correct sentences. U.S. Pat. No. 4,508,347 issued on Apr. 2, 1985 to Shettler discloses an apparatus which includes structural units for creating letters of the alphabet. U.S. Pat. No. 5,275,567 issued on Jan. 4, 1994 to Whitfield discloses an apparatus which includes structural units whereby individual letters and corresponding Braille characters are superimposed thereon.

While such toys may assist in teaching the appearance of words, these devices do not provide a convenient method for teaching the usage, spelling, formation, and meaning of particular words. Moreover, these toys fail to provide structural units for simultaneously relating a descriptive word with a letter and challenging one to spell the words, make sentences out of the words and provide synonyms for the words.

For the foregoing reasons, there is a need for an apparatus for teaching children character and a method for teaching children character.

SUMMARY OF THE INVENTION

The present invention is an apparatus and a method for meeting this need. The apparatus for teaching the usage, meaning, and spelling of words comprises: a plurality of structural units, each of said structural units includes a first face, a second face and at least one additional face; a letter indicia imprinted upon each of the first faces, wherein each letter of the alphabet is represented; a key word indicia imprinted upon each of the second faces, the key word indicia having an initial letter the same as the letter indicia; and at least one synonym indicia imprinted upon the additional face, wherein the synonym indicia on each additional face displaying a synonym of the key word.

The method for teaching the usage, meaning, and spelling of words by using a plurality of structural units, whereby each structural unit comprises a three-dimensional body and a plurality of faces, the method comprising the steps of: imprinting a letter of the alphabet on one of the faces of each of the structural units; assigning a key word that begins with the letter of the imprinting step; marking the key word on one of the faces of the appropriate structural unit; selecting a plurality of synonyms to each of the key words; and printing the synonyms to the remaining faces of the appropriate structural unit.

Accordingly, it is an object of the present invention to provide improved elements and arrangements thereof in an apparatus and method for the purposes described which are inexpensive, dependable, and fully effective in accomplishing their intended purposes.

It is another object of the invention to provide educational apparatus and method to build character in children by association.

It is a further object of the invention to provide an educational apparatus and method to stimulate a child's mind.

Still another object of the invention is to provide an educational apparatus and method in which a child may interact with a parent or instructor.

These and other objects of the present invention will become readily apparent upon further review of the following specification and drawings.

BRIEF DESCRIPTION OF THE DRAWINGS

Similar reference characters denote corresponding feature consistently throughout the attached drawings.

DETAILED DESCRIPTION OF THE PREFERRED EMBODIMENT

Figure 1:
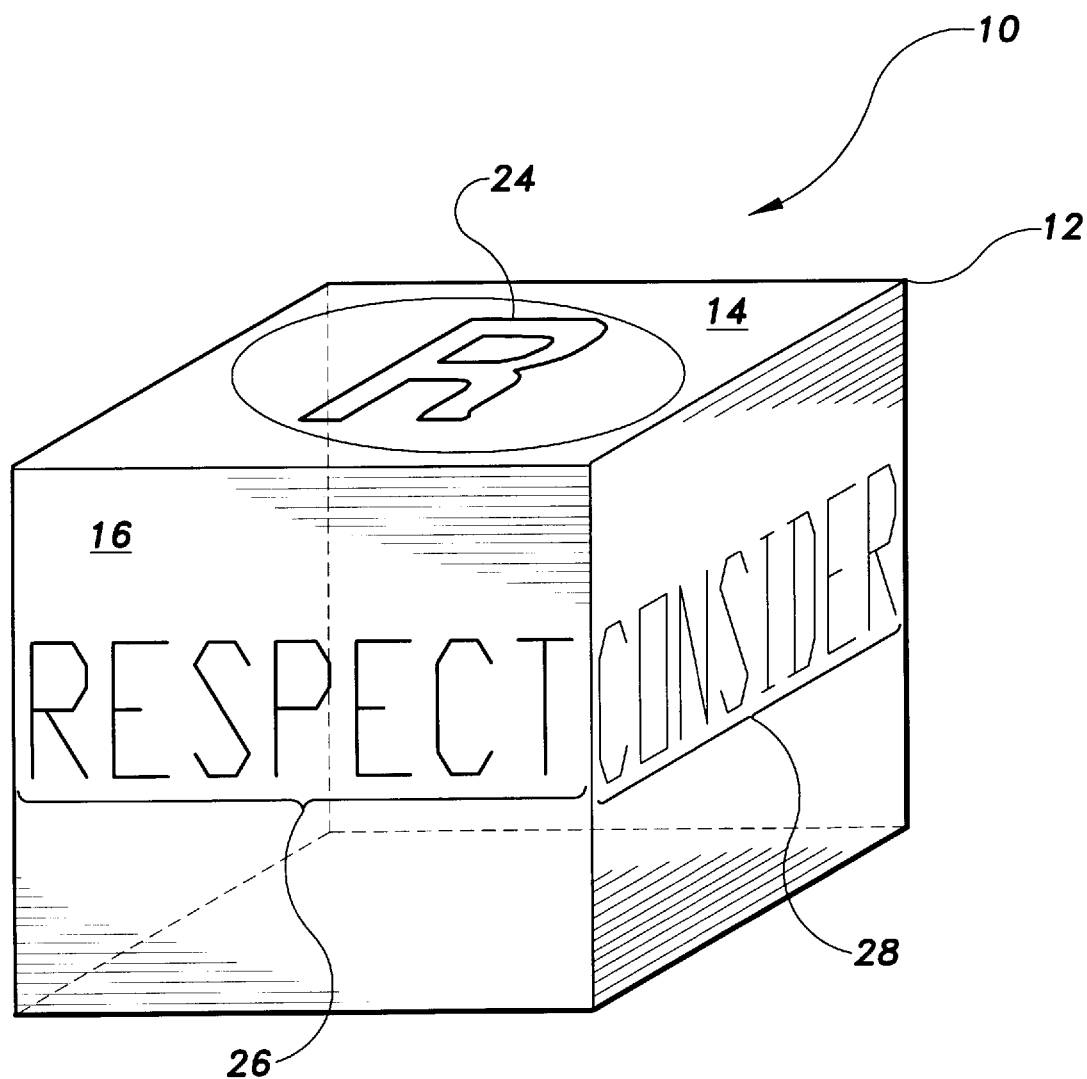
FIG. 1 is a perspective view of an embodiment of the present invention.

The present invention is an apparatus and method for teaching the usage, meaning and spelling of words. The words are chosen because they describe a positive character trait that parents and instructors wish to instill in the minds of children.

The present invention, referred to as character building blocks 10 comprises a plurality of structural units 12 including first face 14, a second face 16 and at least one additional face. The character building blocks 10 has a letter indicia 24 imprinted upon each of the structural units' 12 first face 14. Each letter of the alphabet is represented.

FIG. 1 shows one of the character building blocks' 10 structural unit 12 in it's preferred embodiment. It is preferred that a structural unit 12 is in the shape of a cube having six faces.

The character building blocks 10 has a key word indicia 26 imprinted upon each of the structural units' 12 second face 16. A particular key word indicia 26 is a word that has an initial letter which is the same as the letter indicia 24. Also, the key word indicia 26 is selected because that particular word describes a positive character trait that a parent or instructor would want to instill in the minds of children.

For example, if the letter indicia 24 is the letter "A", then the key word indicia 26 could be "ambition." Examples of other letter indicia/key word indicia combinations can be found below in Table I.

The character building blocks 10 has at least one synonym indicia 28 imprinted upon the structural units' 12 additional faces. A particular synonym indicia 28 is a synonym of particular key word indicia 26. Referring again to the key word indicia 26 "ambition," the following may be synonym indicia 28: "goal," "aim," and "objective." Examples of other key word indicia/synonym indicia combinations can be found below in Table I.

Figure 2:
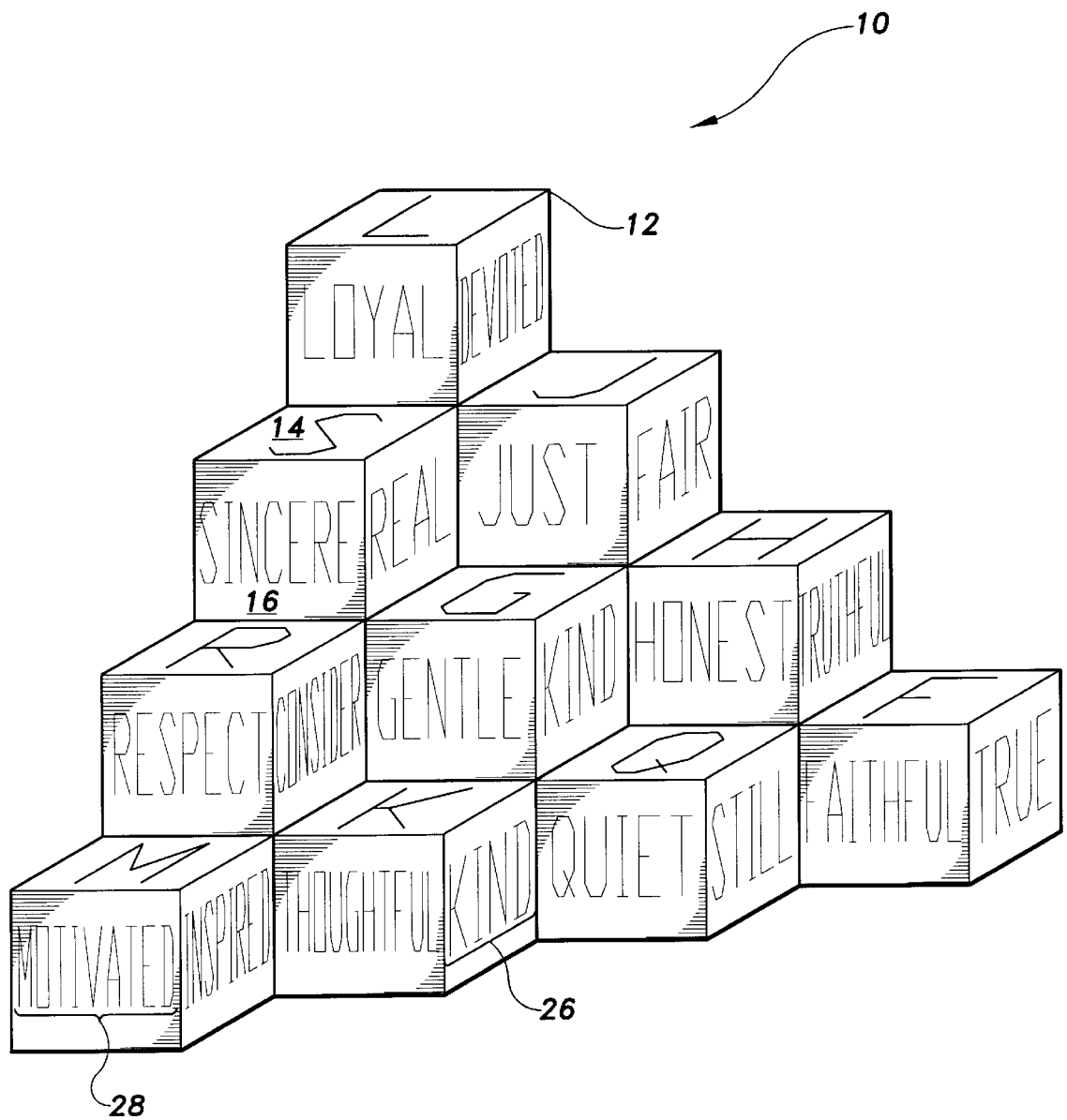
FIG. 2 is a perspective view of a stacked set of a plurality of multi-faced structural units of the embodiment of FIG. 1.

FIG. 2 illustrates a plurality of structural units 12 having a different letter indicia 24 on each of the structural units' 12 first face 14. FIG. 2 also illustrates some of the letter indicia/key word indicia/synonym indicia combinations found in Table I.

TABLE I

| Letter | Key Word | Synonym 1 | Synonym 2 | Synonym 3 |
|---|---|---|---|---|
| A | Ambition | Goal | Aim | Objective |
| B | Bold | Assertive | Confident | Outspoken |
| C | Charity | Love | Giving | Mercy |
| D | Duty | Commitment | Obligation | Responsibility |
| E | Excel | Top-Rate | High-Grade | Surpass |
| F | Faithful | Steadfast | Dedicated | True |
| G | Gentle | Tender | Calm | Mild-Mannered |
| H | Honest | Open | Direct | Truthful |
| I | Inventive | Creative | Original | Resourceful |
| J | Just | Fair | Proper | Impartial |
| K | Kind | Caring | Helpful | Courteous |
| L | Loyal | Constant | Dependable | Devoted |
| M | Motivated | Active | Encouraged | Inspired |
| N | Noble | Dignified | Honorable | Distinguished |
| O | Obedient | Serve | Follow | Responsive |
| P | Persevere | Endure | Continue | Persist |
| Q | Quiet | Still | Composed | Restful |
| R | Respect | Consider | Appreciate | Value |
| S | Sincere | Genuine | Earnest | Real |
| T | Trusted | Credible | Reliable | Believable |
| U | Upright | Virtuous | Decent | Moral |
| V | Valiant | Brave | Heroic | Courageous |
| W | Willing | Cooperative | Ready | Receptive |
| X | The "X" Factor | I am one of a kind | There's only one me | I have unique qualities |
| Y | Yielding | Sharing | Permit | Compromise |
| Z | Zeal | Excited | Passionate | Enthused |
| * | Family | Work Ethic | ** | *** |

*Extra block;
**"Building values for life . . . one block at a time";
***"Building blocks for my future"

For illustrative purposes, the following is a description of how the character building blocks 10 could be used by parents or instructors in their efforts of building character in the minds of children. Building character in children is limited only by the imagination of the parent or instructor.

On a basic level, a parent or instructor could introduce children to the character building blocks 10 and the blocks 10 associated key word indicia 26 and synonym indicia 28 by having the children learn the spelling of the key words and synonyms.

Next, the parent or instructor could discuss the meaning of the various key word indicia 26 and its associated synonym indicia 28 with the child. The parent or instructor could ask the child which of the character traits the child most identifies with.

Then, the parent or instructor could discuss the usage of the various key word indicia 26 and its associated synonym indicia 28 with the child.

It is to be understood that the present invention is not limited to the sole embodiment described above, but encompasses any and all embodiments within the scope of the following claims.

I claim:

1. An educational apparatus for teaching the usage, meaning, and spelling of words, the apparatus comprising:

a plurality of structural units, each of said structural units includes a first face, a second face and at least one additional face;

a letter indicia imprinted upon each of said first faces, wherein each said letter indicia is a different letter of the alphabet;

a key word indicia imprinted upon each of said second faces, said key word indicia having an initial letter the same as said letter indicia as imprinted upon said first face associated with said second face of a single structural unit; and at least one synonym indicia imprinted upon said additional face, wherein said synonym indicia on each additional face displays a synonym of said key word as imprinted upon said second face associated with said first face of a single structural unit.

2. The educational apparatus for teaching the usage, meaning, and spelling of words according to claim 1, wherein said plurality of structural units are cubes having six faces.

3. The educational apparatus for teaching the usage, meaning, and spelling of words according to claim 1, wherein:

said key word imprinted upon each of said respective second faces of a structural unit corresponding to the letter indicia "A" imprinted on the first face of the respective structural unit is ambition;

said key word imprinted upon each of said respective second faces of a structural unit corresponding to the letter indicia "B" imprinted on the first face of the respective structural unit is bold;

said key word imprinted upon each of said respective second faces of a structural unit corresponding to the letter indicia "C" imprinted on the first face of the respective structural unit is charity;

said key word imprinted upon each of said respective second faces of a structural unit corresponding to the letter indicia "D" imprinted on the first face of the respective structural unit is duty;

said key word imprinted upon each of said respective second faces of a structural unit corresponding to the letter indicia "E" imprinted on the first face of the respective structural unit is excel;

said key word imprinted upon each of said respective second faces of a structural unit corresponding to the letter indicia "F" imprinted on the first face of the respective structural unit is faithful;

said key word imprinted upon each of said respective second faces of a structural unit corresponding to the letter indicia "G" imprinted on the first face of the respective structural unit is gentle;

said key word imprinted upon each of said respective second faces of a structural unit corresponding to the letter indicia "H" imprinted on the first face of the respective structural unit is honest;

said key word imprinted upon each of said respective second faces of a structural unit corresponding to the letter indicia "I" imprinted on the first face of the respective structural unit is inventive;

said key word imprinted upon each of said respective second faces of a structural unit corresponding to the letter indicia "J" imprinted on the first face of the respective structural unit is just;

said key word imprinted upon each of said respective second faces of a structural unit corresponding to the letter indicia "K" imprinted on the first face of the respective structural unit is kind;

said key word imprinted upon each of said respective second faces of a structural unit corresponding to the letter indicia "L" imprinted on the first face of the respective structural unit is loyal;

said key word imprinted upon each of said respective second faces of a structural unit corresponding to the letter indicia "M" imprinted on the first face of the respective structural unit is motivated;

said key word imprinted upon each of said respective second faces of a structural unit corresponding to the letter indicia "N" imprinted on the first face of the respective structural unit is noble;

said key word imprinted upon each of said respective second faces of a structural unit corresponding to the letter indicia "O" imprinted on the first face of the respective structural unit is obedient;

said key word imprinted upon each of said respective second faces of a structural unit corresponding to the letter indicia "P" imprinted on the first face of the respective structural unit is persevere;

said key word imprinted upon each of said respective second faces of a structural unit corresponding to the letter indicia "Q" imprinted on the first face of the respective structural unit is quiet;

said key word imprinted upon each of said respective second faces of a structural unit corresponding to the letter indicia "R" imprinted on the first face of the respective structural unit is respect;

said key word imprinted upon each of said respective second faces of a structural unit corresponding to the letter indicia "S" imprinted on the first face of the respective structural unit is sincere;

said key word imprinted upon each of said respective second faces of a structural unit corresponding to the letter indicia "T" imprinted on the first face of the respective structural unit is trusted;

said key word imprinted upon each of said respective second faces of a structural unit corresponding to the letter indicia "U" imprinted on the first face of the respective structural unit is upright;

said key word imprinted upon each of said respective second faces of a structural unit corresponding to the letter indicia "V" imprinted on the first face of the respective structural unit is valiant;

said key word imprinted upon each of said respective second faces of a structural unit corresponding to the letter indicia "W" imprinted on the first face of the respective structural unit is willing;

said key word imprinted upon each of said respective second faces of a structural unit corresponding to the letter indicia "X" imprinted on the first face of the respective structural unit is the 'X' factor;

said key word imprinted upon each of said respective second faces of a structural unit corresponding to the letter indicia "Y" imprinted on the first face of the respective structural unit is for the letter "Y" is yielding; and said key word imprinted upon each of said respective second faces of a structural unit corresponding to the letter indicia "Z" imprinted on the first face of the respective structural unit is zeal.

4. An educational method for teaching the usage, meaning, and spelling of words by using a plurality of structural units, whereby each structural unit comprises a three-dimensional body and a plurality of faces, the method comprising the steps of:

imprinting a letter of the alphabet on one of the faces of each of the structural units;

assigning a key word that begins with said letter of said imprinting step;

marking said key word on one of the faces of the appropriate structural unit;

selecting a plurality of synonyms to each of said key words; and printing said synonyms to the remaining faces of the appropriate structural unit.

5. The educational method for teaching the usage, meaning, and spelling of words by using a plurality of structural units according to claim 4, further comprising the steps of:

picking a structural unit;

spelling said key word of the structural unit and said synonyms of said key words discussing the meaning of said key word of the structural unit and said synonyms of said key words; and discussing the usage of said key word of the structural unit and said synonyms of said key words.

* * * * *